United States Patent [19]
Sakurada et al.

[11] Patent Number: 4,635,078
[45] Date of Patent: Jan. 6, 1987

[54] INTERMEDIATE GRADIENT IMAGE PRODUCING METHOD

[75] Inventors: Nobuaki Sakurada, Yokohama; Hideaki Kawamura; Takashi Sasaki, both of Tokyo, all of Japan

[73] Assignee: Canon Kabushiki Kaisha, Tokyo, Japan

[21] Appl. No.: 603,229

[22] Filed: Apr. 23, 1984

[30] Foreign Application Priority Data

Apr. 28, 1983 [JP] Japan .................................. 58-75859
Jul. 8, 1983 [JP] Japan ................................ 58-125077
Jul. 15, 1983 [JP] Japan ................................ 58-129246

[51] Int. Cl.⁴ ........................ G01D 15/18; H04N 1/46
[52] U.S. Cl. ................................ 346/140 R; 346/1.1; 358/75
[58] Field of Search ............... 346/1, 140 PD; 358/75

[56] References Cited
U.S. PATENT DOCUMENTS

| | | | |
|---|---|---|---|
| 4,412,225 | 10/1983 | Yoshida et al. | 346/1.1 |
| 4,412,226 | 10/1983 | Yoshida | 346/1.1 |
| 4,446,470 | 5/1984 | Sugiyama et al. | 346/140 PD |
| 4,494,128 | 1/1985 | Vaught | 346/140 PD |
| 4,499,479 | 2/1985 | Chee-Shuen Lee et al. | 346/140 PD |

FOREIGN PATENT DOCUMENTS 156264 9/1982 Japan .......................... 346/140 PD Primary Examiner—George H. Miller, Jr.
Attorney, Agent, or Firm—Fitzpatrick, Cella, Harper & Scinto

[57] ABSTRACT

A color image reproducing method uses at least cyan, magenta and yellow colorants, in which at least one color among them has a plurality of kinds of coloring densities. According to this method, various microdots having different densities are formed; sizes of these dots are variably controlled; one pixel consisting of a plurality of cells is provided; the frequency of occurrences in one pixel of the microdots of the high density colorant and of the microdots of the low density colorant is varied in accordance with a reproduction density; and the thick microdot and thin microdot have sizes so as to reproduce almost the same reflection optical density. An intermediate region which is not included in any of the density reproduction ranges of the high and low density colorants is set, and this mid-density region is reproduced using both of the microdots of the high density colorant and the microdots of the low density colorant. A dither matrix method may be used for this reproduction. As a result, false profiles can be prevented and a color picture image with high gradient and high quality is derived.

16 Claims, 30 Drawing Figures

FIG. 2

FIG. 13A
```
       X
    0    1
  ┌────┬────┐
0 │0.50│0.54│
Y ├────┼────┤
1 │0.56│0.52│
  └────┴────┘
```
FIG. 13B
```
         X
    0    1    0    1
  ┌────┬────┬────┬────┐
0 │0.52│0.52│0.56│0.56│
Y ├────┼────┼────┼────┤
1 │0.52│0.52│0.56│0.56│
  ├────┼────┼────┼────┤
0 │0.54│0.54│0.58│0.58│
  ├────┼────┼────┼────┤
1 │0.54│0.54│0.58│0.58│
  └────┴────┴────┴────┘
```
FIG. 13C
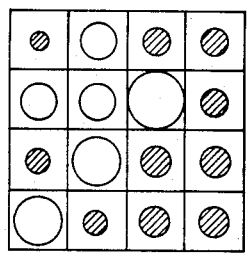
FIG. 14
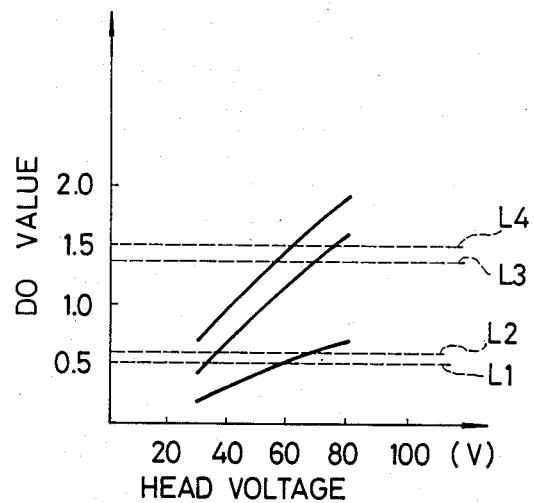

FIG. 21A
```
    X →
Y    0    1
↓ 0 0.50 0.66
  1 0.74 0.58
```
FIG. 21B
```
    X →
Y    0    1    0    1
↓ 0 0.56 0.56 0.72 0.72
  1 0.56 0.56 0.72 0.72
  0 0.66 0.66 0.82 0.82
  1 0.66 0.66 0.82 0.82
```
FIG. 21C
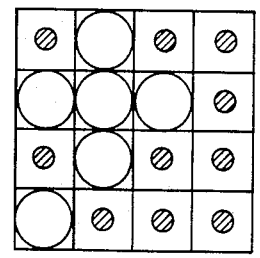
FIG. 22
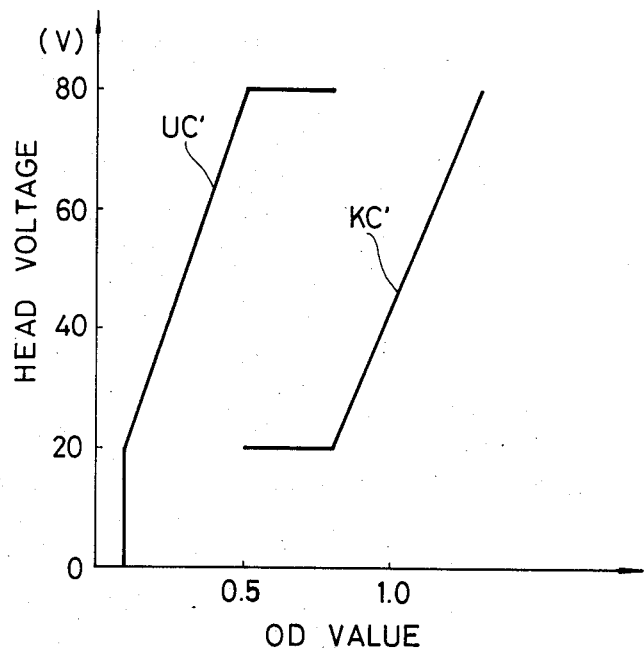

INTERMEDIATE GRADIENT IMAGE PRODUCING METHOD

BACKGROUND OF THE INVENTION

1. Field of the Invention

The present invention relates to an image producing method which is effective for expression of a gradient and, more particularly, to an image producing method for producing a picture image using a plurality of kinds of microdots having different densities.

The present invention also relates to a color image reproducing method for reproducing a color picture image using colorants of a plurality of colors and, more particularly, to a color image reproducing method using a plurality of colorants in which at least one color among a plurality of colors has different coloring densities.

An ink-jet printer will be described hereinbelow as an example of the apparatuses to realize such methods. However, it will be clear that the present invention can be applied even to image producing apparatuses of other types such as a printer of the thermal transfer copying type, or an electrophotographic printer, or the like.

2. Brief Description of Related Art

There has been proposed so far an image producing method for deriving a gradient by using a plurality of kinds of microdots having different densities (or "concentrations") and controlling the size of each dot. According to such a method, it is possible to express a gradient which cannot be expressed when dots of only one density are used. However, at the boundary portion between the dots having different densities, even if reflection optical densities of the thick dot and thin dot have been almost equally set, the difference in quality feeling due to the difference between the densities which are peculiar to those dots can be visually sensed, so that this results in a false profile and causes picture quality deteriorate.

On the other hand, a color picture image is generally reproduced using three colors which are for example, cyan, magenta and yellow, or using four colors which are such three colors and black in addition. Recently, there has been proposed a method whereby a plurality of colorants in which one color has different coloring densities are used for the purpose of enhancement of a color reproduction range.

In case of using two thick and thin colorants, a reproduction density range is remarkably enhanced since the colorants are changed over and are used in accordance with a reproduction density.

However, even in case of such a color picture image, there can occur similarly, but less noticeably, a difference in quality feeling among the microdots to be produced by the thick and thin colorants at the switching portions of the colorants, so that a so-called false profile is produced at this portion, which causes the quality of a reproduced picture image to deteriorate.

SUMMARY OF THE INVENTION

The present invention intends to eliminate such drawbacks in an example as mentioned above and has an object to provide an image producing method by which a picture image with high gradient and high quality can be formed by visually smoothing the connecting relation between the dots having different densities as well as by smoothing the density difference therebetween.

It is also another object of the present invention to provide a color image producing method using colorants of three or four colors in which at least one color among them uses colorants having a plurality of densities, whereby it is possible to prevent the occurrence of a false profile due to the density differences among the colorants, thereby enabling a color picture image with high quality to be reproduced.

In addition, it is a further object of the invention to provide an image producing method whereby in the cases where there is only a little overlapped portion in reproduction density ranges of two thick and thin colorants and where there is no overlapped range, it is possible to prevent the occurrence of a false profile due to the density difference between the colorants, thereby enabling a picture image with high quality or a color picture image to be reproduced.

Other objects and features of the present invention will be more apparent from the following detailed description in conjunction with accompanying drawings.

BRIEF DESCRIPTION OF THE DRAWINGS

FIGS. 13A, 13B abd 13C show diagrams to describe the operation of the head selecting control circuit;

FIG. 14 is a diagram showing the characteristics between the head voltage and the OD value in another embodiment;

FIGS. 21A, 21B and 21C show diagrams to describe the operation of the head selecting control section in the fourth embodiment; and FIG. 22 is a diagram showing the relations between the OD value and the applied voltage in the fourth embodiment.

DETAILED DESCRIPTION OF THE PREFERRED EMBODIMENTS

Although the present invention can be applied to dot printers of various types such as an ink jet printer, thermal printer, thermal transfer copying type printer, electrostatic type printer, or the like, the ink-jet printer will be particularly described in the following embodiment. In addition, an average reflection optical density OD which will be used hereinbelow denotes an optical density which is obtained by a commercially available densitometer when dots are uniformly formed in a predetermined area and is used independently of the peculiar density (dye concentration or the like) which a recording agent such as an ink or the like has.

Description of the First Embodiment

Figure 1:
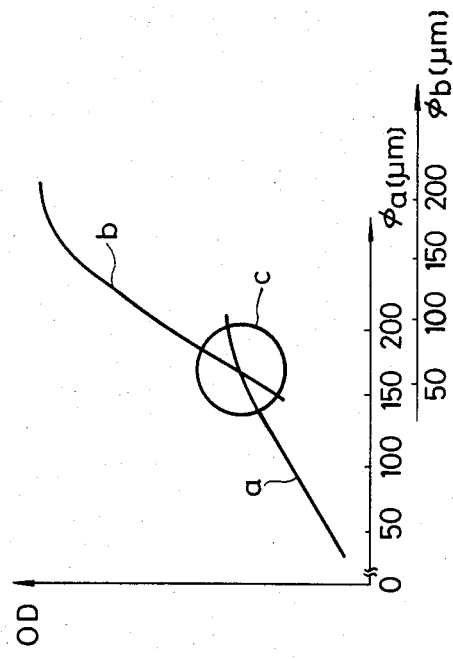
FIG. 1 is a diagram showing the relations among the dot diameters of thick and thin inks and the OD (an average, reflection optical density) value.

FIG. 1 is a diagram showing the relations of the average reflection optical density OD for the dot diameters of thick and thin inks used in a first embodiment. In the diagram, a reference character a denotes a characteristic curve of a thin ink; b indicates a characteristic curve of a thick ink; $\phi_a$ in the abscissa, represents a dot diameter of the thin ink; $\phi_b$ is a dot diameter of the thick ink; and the ordinate represents a reflection optical density OD.

As shown in the diagram, as the dot diameters $\phi_a$ and $\phi_b$ are increased, the reflection optical density OD increases. Namely, a thick picture image is obtained.

On the other hand, a region c in FIG. 1 represents the region where the reflection optical densities OD of the thick and thin inks overlap. In this overlapped region c, either ink may be also used to express the same density.

As described before, if the use of the thick and thin inks has been unconditionally determined in such a manner that the thin ink is used when an OD value is below a predetermined level and that the thick ink is used when an OD value is over the predetermined level, a false profile will have occurred. Therefore, in this embodiment, the frequency of occurrence of the thick ink and the frequency of occurrence of the thin ink are gradually changed in the region c.

Figure 2:
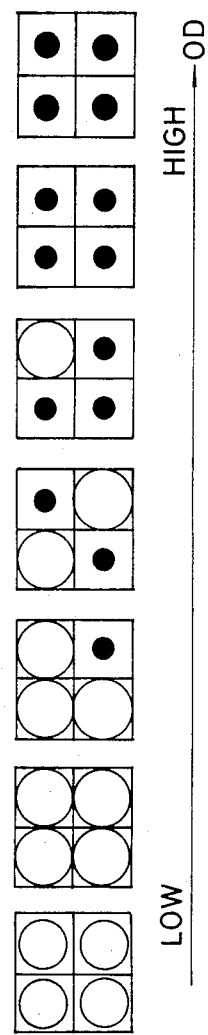
FIG. 2 is a diagram showing the patterns at the boundary portion between thick and thin dots.

FIG. 2 is a diagram showing pixel constitutions at the boundary portion among the thick and thin dots. That is, it shows a pixel constituting method of the region c in FIG. 1. In this embodiment, one pixel is constituted by four dots and, by changing the frequency of occurrences of the dots having different densities as shown in the diagram, not only a density change but also a change in quality feeling are made as small as possible. A reflection optical density OD of a small dot by an ink having a high density and that of a relatively large dot by an ink having a low density have the almost same density value in a microcell which corresponds to ¼ of one pixel. In addition, in the diagram ● denotes a dot produced by the thick ink, while ○ represents a dot produced by the thin ink.

Figure 3:
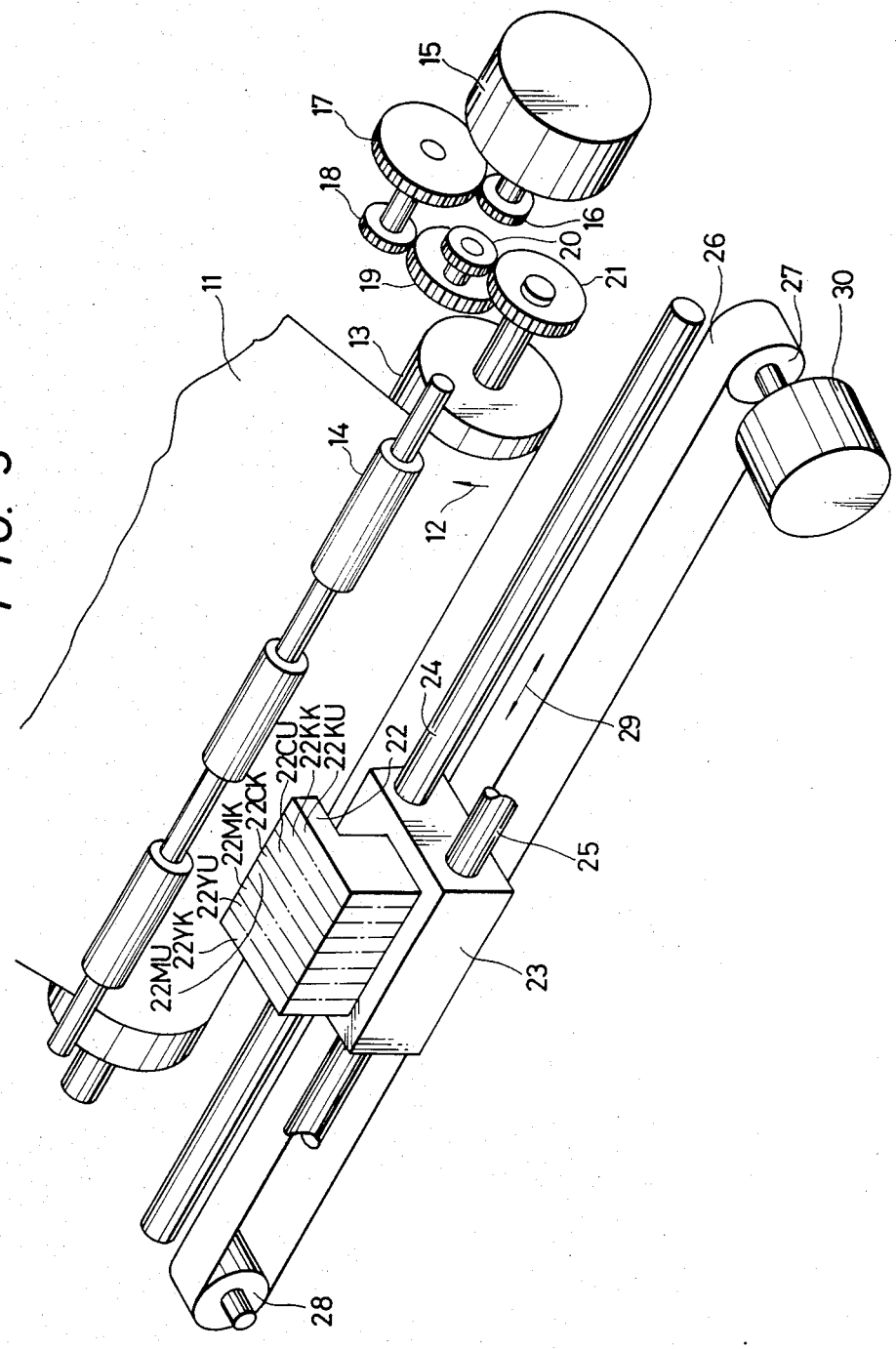
FIG. 3 is a perspective view illustrating the recording section of an ink-jet printer.

A constitution of an ink-jet printer in a first embodiment will then be described. FIG. 3 is a perspective view illustrating a recording section of the ink-jet printer. In the diagram, a reference numeral 11 denotes a recording paper serving as a recording medium and this paper is moved by a platen 13 and a pinch roller 14 in the direction indicated by an arrow 12, while a picture image is recorded on the recording paper 11. The driving force of a paper feed motor 15 is transferred through gears 16–21 to the platen 13, thereby rotating the platen. A numeral 22 is a head unit attached on a carriage 23 and has heads 22YK, 22YU, 22MK, 22MU, 22CK, 22CU, 22KK, and 22KU for emitting thick and thin inks of each of yellow, magenta, cyan, and black. As each of these heads, an ink-jet head whose quantity of emission varies depending upon the energy to be applied is used. As such a head, there is used for example an ink-jet head such as disclosed in the specification of U.S. Pat. No. 3,683,212 or U.S. Pat. No. 3,946,398. The carriage 23 is slidably attached to sliding axes 24 and 25. The driving force of a carriage drive motor 30 is transmitted as the linear motion by rollers 27 and 28 and a belt 26, thereby allowing the carriage 23 to be moved in the direction indicated by an arrow 29.

Figure 4:
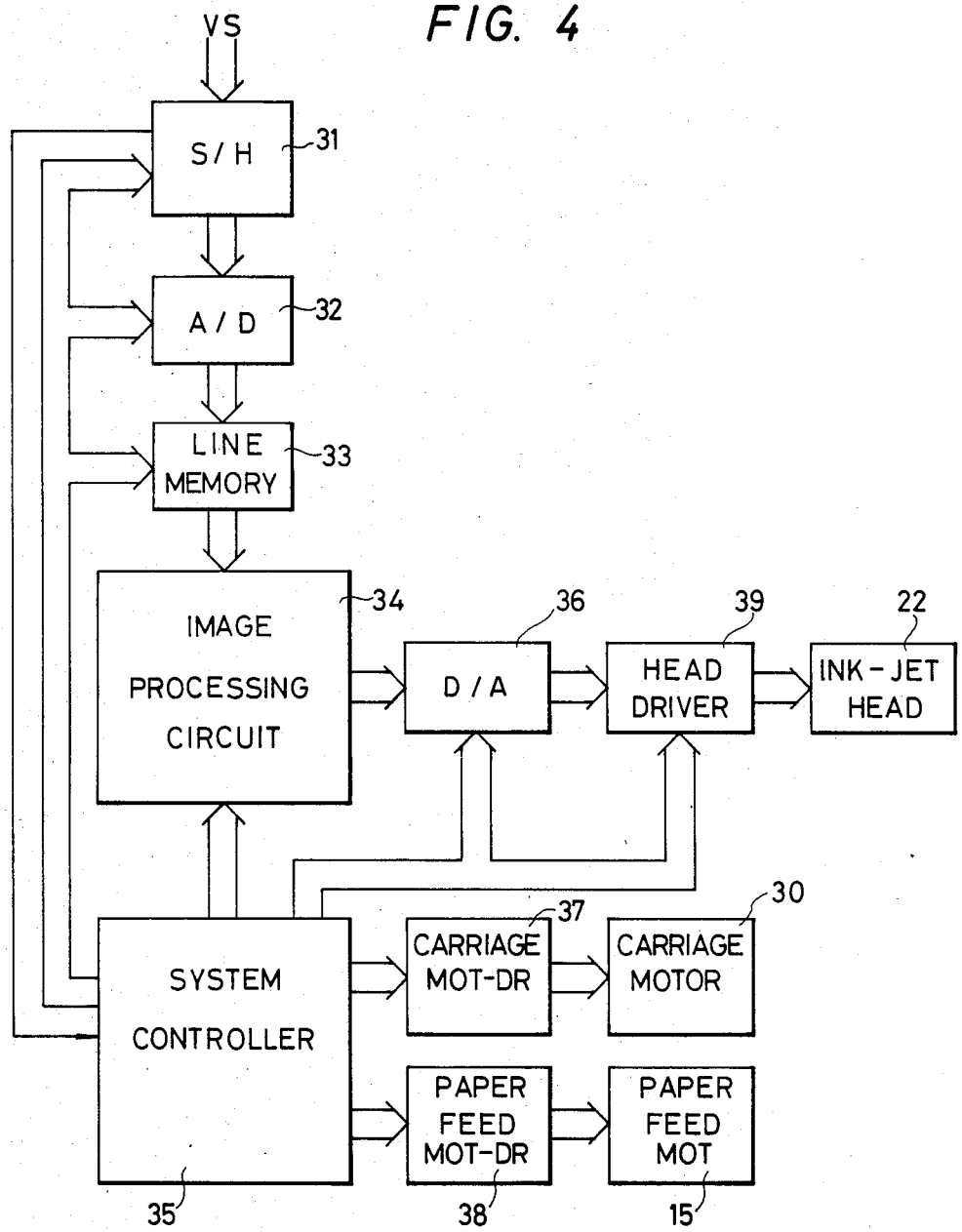
FIG. 4 shows a control block diagram of the printer in a first embodiment.

FIG. 4 shows a control block diagram of such an ink-jet printer. In the diagram, a video signal VS which includes respective chroma signals of R, G and B and sync signals is input to a sample and hold circuit 31. This sample and hold circuit 31 allows those signals to be synchronized and then samples and holds each chroma signal at a predetermined timing. Each chroma signal sampled and held is transmitted to an A/D converter 32 and is converted into a digital signal indicative of the gradient, then such digital signals of a predetermined number of lines are stored into a line memory 33. The digital signals in the line memory 33 are subjected to the processings such as the masking processing, undercolor removing processing, and the like by an image processing circuit 34, and thereafter the circuit 34 outputs a digital value representing a voltage to be applied to each ink head. This output is converted into an analog signal by a D/A converter 36, thereby allowing each ink-jet head to be driven through a head driver 39. On the other hand, a system controller 35 controls the sequence of the printer and at the same time it generates a head drive signal, a carriage motor drive signal and a paper feed signal at timings corresponding to the sync signals in the input video signal VS. These signals are respectively supplied to the head driver 39, a carriage motor driver 37 and a paper feed motor driver 38, so that the ink-jet head 22, carriage motor 30 and paper feed motor 15 are controlled at desired timings, thereby allowing a reproduced picture image of the input video signal to be printed on the recording paper 11.

Figure 5:
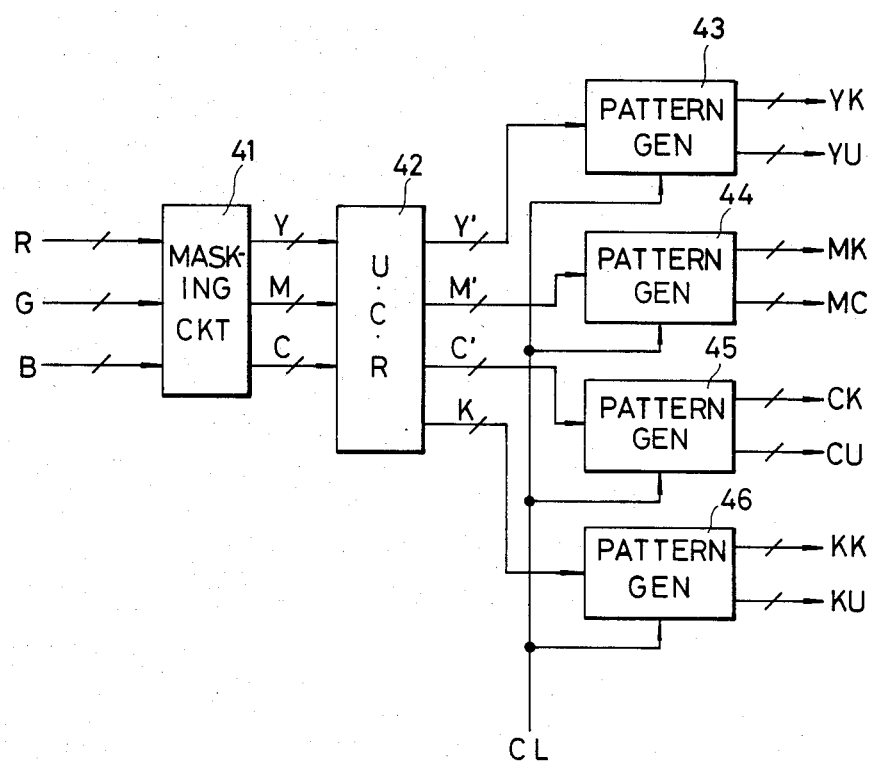
FIG. 5 shows a detailed block diagram of an image processing circuit 34 in FIG. 4.

Then, there will be described the operation of FIG. 5, which shows a detailed circuit diagram of the image processing circuit 34 in FIG. 4.

The output signals of the line memory 33, i.e., the digital values of the respective chroma signals of R, G and B are subjected to the masking processing by a masking circuit 41 and are converted into the digital signals Y, M and C each representing a density of each recording color. An under-color removing circuit 42 fetches a colorless component K which is the common component of Y, M and C and subtracts the colorless component from Y, M and C to produce digital signals Y', M', C', and K which indicate densities of the actual recording colors.

The digital signal Y' indicative of a density of yellow is input to a pattern generator 43. In order to obtain the pattern as shown in FIG. 2, the pattern generator 43 generates a digital signal YK indicating a voltage value to be applied to the head 22YK for the thick yellow ink in accordance with the input digital value and a digital signal YU representing a voltage value to be applied to the head 22YU for the thin yellow ink. The microcells in one pixel in the pattern shown in FIG. 2 are switched in response to a carriage driving clock signal CL. Other pattern generators 44, 45 and 46 similarly generate digital signals MK, MU, CK, CU, KK and KU.

Each of those output signals is converted into the analog drive signal for driving each head by the D/A converter 36, respectively.

In this way, the patterns as shown in FIG. 2 are obtained near the boundary portions among the thick and thin dots.

Figure 6:
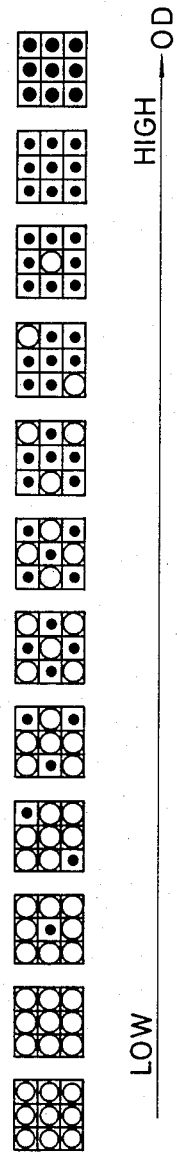
FIGS. 6 and 7 are diagrams showing other patterns at the boundary portion.

FIG. 6 shows an embodiment in the case where one pixel is constituted by nine cells. Different from FIG. 2 in which one pixel is expressed by four cells, FIG. 7 shows an embodiment which intends to derive smoother changes in density and quality feeling by changing not only the frequency of occurrences of the dots by the inks having different densities but also the dot diameters by the respective inks.

Figure 7:
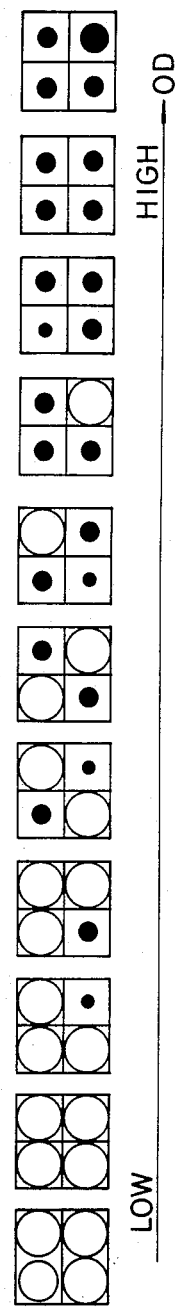

The patterns as shown in FIGS. 6 and 7 can be obtained by modifying the constitutions of the pattern generators 43 to 47.

In addition, although two kinds of thick and thin recording agents have been used in the first embodiment, it is obviously possible to use recording agents having three or more densities. Also an example of the ink-jet printer has been described, but the present invention may be applied to other various kinds of printers such as a thermal printer, thermal transfer copying type printer, electrostatic type printer, and the like if they are dot printers which can change a size of a dot. Furthermore, although an example of the color printer has been described, the invention can be also apparently applied to reproduce a monochrome picture image such as a black and white picture image and the like.

As described above, according to the first embodiment of the present invention, the continuity can be presented for both density and quality feeling at the boundary portions among the thick and thin dots; therefore, this prevents the occurrence of a false profile and enables a picture image with high quality and high gradient to be obtained.

Description of the Second Embodiment

Figure 8:
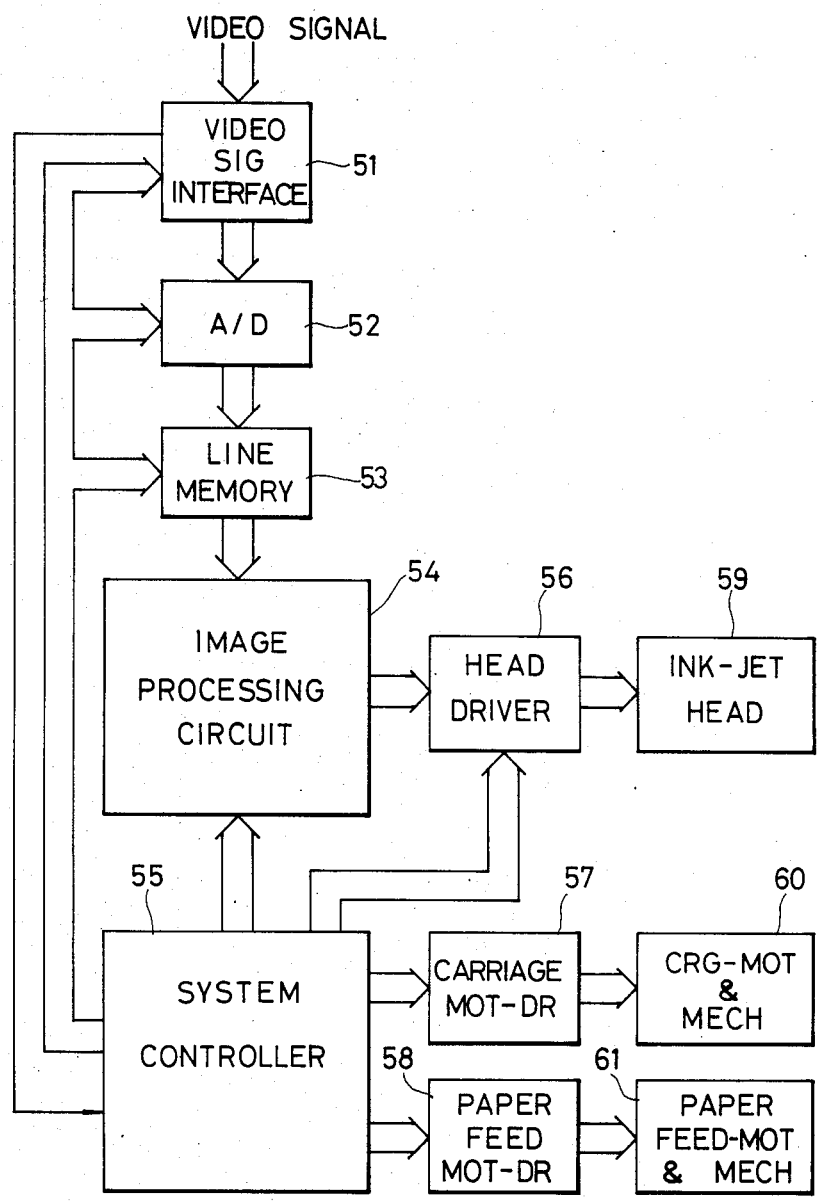
FIG. 8 shows a control block diagram of a color ink-jet printer in a second embodiment.

FIG. 8 shows a block diagram for the signal processing in the case where the present invention was applied to an ink-jet color printer.

A video signal of a projection image, i.e., a composite video signal including respective chroma signals of, for instance, R, G and B and sync signals is input to a video signal interface 51. Those signals are synchronized with each other by the interface 51 and then are sampled and held by a sample and hold circuit. These signals are transmitted to an A/D converter 52 at the next stage and the gradient signals of the image signals R, G and B are converted into the digital signals. These digital signals of a proper number of lines are stored in a next line memory 53. The lines are generally set in the vertical direction, but is obvious that they may be set in the horizontal direction. The data in this line memory is then subjected to the processings such as color transformation, $\gamma$ transformation, masking processing, undercolor removal, etc. for every pixel by an image processing circuit 54. Thus, those signals are transformed generally into signals of cyan, magenta, yellow, and black and are further converted into the applied voltage values of the respective heads and then they are input to a head driver 56. Each ink-jet head 59 emits the ink of a quantity corresponding to a magnitude of the applied voltage, thereby expressing a hue and a density.

On the other hand, a system controller 55 controls the sequence of the printer and at the same time it generates a head drive signal, a carriage motor drive signal and a paper feed signal at timings corresponding to the input image signal. These signals are respectively supplied to the head driver 56, a carriage motor driver 57 and a paper feed motor driver 58, so that the ink-jet head 59, a carriage motor and its mechanism 60, and a paper feed motor and its mechanism 61 are controlled at desired timings, thereby allowing a reproduced picture image of the input video signal to be printed on the recording medium.

Figure 9:
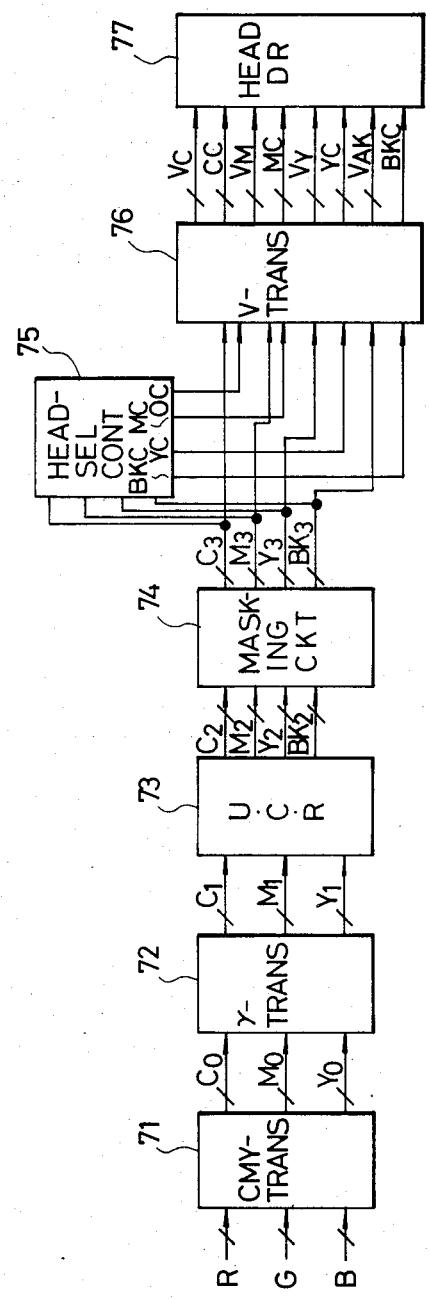
FIG. 9 shows a detailed circuit diagram of the image processing circuit in FIG. 8.

FIG. 9 shows a detailed block diagram of the image processing circuit 54 in FIG. 8.

The R, G and B signals are transformed into density signals $C_0$, $M_0$ and $Y_0$ of cyan, magenta and yellow by a CMY-transducing section 71. For example, the processings of $C_0 = -\log_{10}R$, $M_0 = -\log_{10}G$ and $Y_0 = -\log_{10}B$ are performed.

Then, the $\gamma$ transformation is performed by a $\gamma$ transducing section 72. For example, the processings of $C_1 = a_1 (C_0)^{\gamma_1} + b_1$
$M_1 = a_2 (M_0)^{\gamma_2} + b_2$
$Y_1 = a_3 (Y_0)^{\gamma_3} + b_3$ are carried out.

Subsequently, it is determined by an undercolor removing circuit 73 whether black is used or not. In case of using black, the black component is subtracted from the other $C_1$, $M_1$ and $Y_1$, respectively. For example, assuming that $BK_2 = \alpha\{\text{Min } (C_1, M_1, Y_1)\} + \beta$, and when $BK_2$ is larger than a certain value $L_B$, black is used, so that we will have $C_2 = C_1 - BK_2$
$M_2 = M_1 - BK_2$
$Y_2 = Y_1 - BK_2$ On the other hand, when $BK_2 < L_B$, $C_2 = C_1$
$M_2 = M_1$
$Y_2 = Y_1$ Furthermore, the masking processing is executed by a masking circuit 74 in consideration of the unnecessary absorption of the inks to derive densities $C_3$, $Y_3$, $M_3$, and $BK_3$ of each color.

Generally, the processings of $C_3 = f_C (C_2, M_2, Y_2, BK_2)$
$M_3 = f_M (C_2, M_2, Y_2, BK_2)$
$Y_3 = f_Y (C_2, M_2, Y_2, BK_2)$
$BK_3 = f_{BK} (C_2, M_2, Y_2, BK_2)$ are performed.

The following matrix may be used as functions $f_C$, $f_M$, $f_Y$, and $f_{BK}$.

$$\begin{pmatrix} C_3 \\ M_3 \\ Y_3 \\ BK_3 \end{pmatrix} = \begin{pmatrix} M_{11} & M_{12} & M_{13} & M_{14} \\ M_{21} & M_{22} & M_{23} & M_{24} \\ M_{31} & M_{32} & M_{33} & M_{34} \\ M_{41} & M_{42} & M_{43} & M_{44} \end{pmatrix} \begin{pmatrix} C_2 \\ M_2 \\ Y_2 \\ BK_2 \end{pmatrix}$$

A coefficient $M_{ij}$ of the matrix is derived by processing the data to be obtained by actually color-reproducing by way of a method of least squares.

Then, with respect to which ink of a density is used, the determination is made by a head selecting control section 75 in accordance with the densities $C_3$, $M_3$, $Y_3$, and $BK_3$ of each color, so that the head selecting control section 75 outputs selection signals CC, MC, YC, BKC of each head for the thick and thin inks.

A voltage value transducing section 76 outputs applied voltage values $V_C$, $V_M$, $V_Y$, and $V_{BK}$ to each head to a head driver 77 on the basis of the densities $C_3$, $M_3$, $Y_3$, and $BK_3$ of the respective colors and the selection signals CC, MC, YC, and BKC. The head driver 77 applies the analog voltages corresponding to the voltage values $V_C$, $V_M$, $V_Y$, and $V_{BK}$ to each ink-jet head selected in response to the selection signals CC, MC, YC, and BKC.

Figure 10:
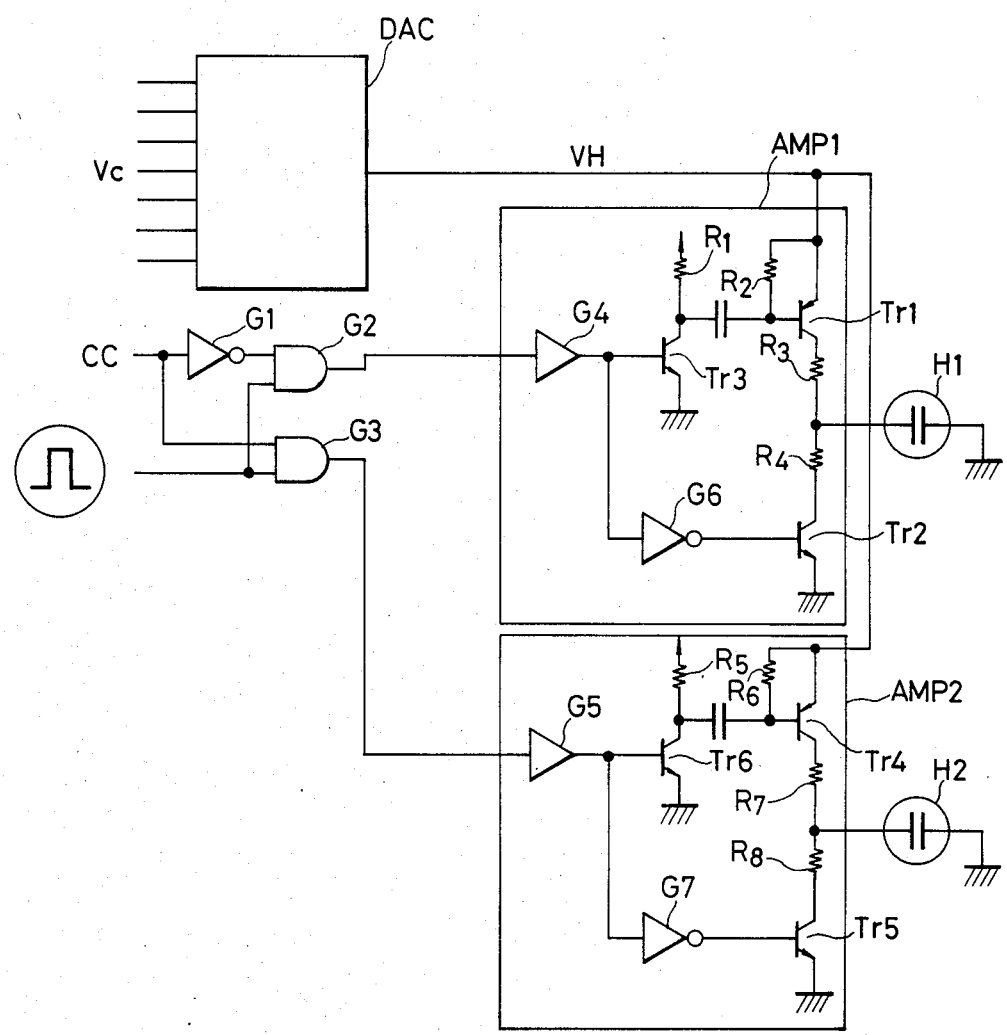
FIG. 10 shows a detailed circuit diagram of a head driver 77.

FIG. 10 shows a detailed circuit of the head driver 77 in FIG. 9. The control of the ink-jet head will be described with respect to an example of the signal processing of cyan with reference to FIG. 10. The digital signal $V_C$ from the voltage value transducing section 76 shown in FIG. 9 is input to a D/A converter DAC for modulating the head applied voltage, thereby generating a voltage $V_H$ corresponding to the digital signal. In addition, the head selection signal CC to be output from the head selecting control section 75 is input to one input terminal of an AND gate G3 and is also input through an inverter G1 to one input terminal of an AND gate G2 similarly. Now, when the signal CC is at a low level, a head H1 is selected, while when it is at a high level, a head H2 is selected. A drive pulse for the heads are input from the system controller 55 to the other input terminals of the AND gates G2 and G3, respectively. The driving of the head H1 when the signal CC is at a low level will now be described. Since one input terminal of the AND gate G2 is at a high level, when the head drive pulse becomes a high level, an output of the AND gate G2 becomes a high level, so that an output of a buffer G4 becomes a high level. Thus, a transistor Tr3 is turned on and a transistor Tr1 is also turned on. Now, the voltage $V_H$ is applied through a resistor R3 to the head H1. Due to this, a piezo transducer shrinks in the direction of a bore of a glass tube, thereby causing a colorant droplet to be emitted. A quantity of colorant droplet to be emitted is controlled depending upon the voltage $V_H$.

At this time, a transistor Tr2 is off since an output of an inverter G6 is at a low level. When the pulse becomes a low level subsequently, on the contrary, the transistor Tr1 is turned off and Tr2 is turned on, so that the charges charged in the head H1 are discharged through a resistor R4, allowing the piezo transducer to be returned to the original state. In this way, the emission of the ink droplets is controlled.

The detailed operation of the head selecting control section 75 will then be described.

Figure 11:
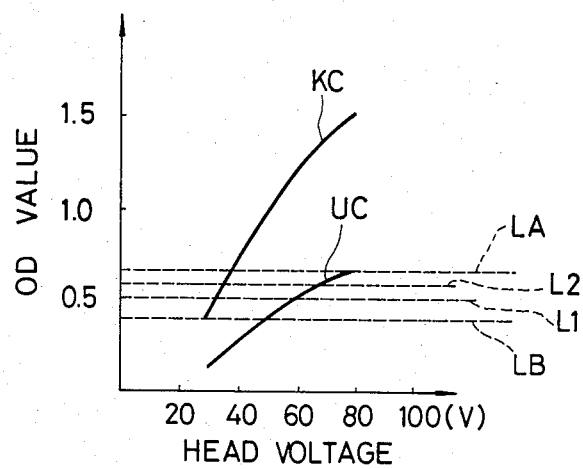
FIG. 11 is a diagram showing the characteristics between the head voltage and the OD value.

FIG. 11 shows the characteristics between the head applied voltage of the cyan ink and the reproduction average reflection optical density (hereinbelow, referred to as an OD value). A reference character KC denotes a thick cyan ink and UC represents a thin cyan ink. As shown in FIG. 11, the thin cyan ink UC can reproduce the OD values from 0.15 to 0.67, while the thick cyan ink KC can reproduce the OD values from 0.40 to 1.50. In this way, since the lowest OD value LB of the thick ink is set to be lower than the highest OD value LA of the thin ink, the OD values from 0.40 to 0.67 can be expressed by any of the thick and thin inks; therefore, this region is called an overlapped region.

Figure 12:
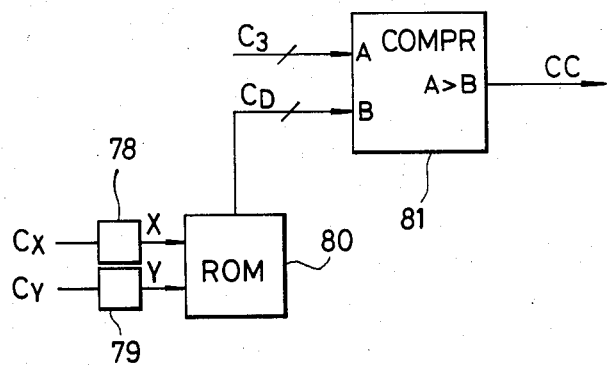
FIG. 12 shows a detailed circuit diagram of a head selecting control section.

The thick ink KC and the thin ink UC are individually emitted in a part of the overlapped region, i.e., in a range of the OD values from L1 to L2; the thin ink UC is mainly used in case of reproducing the OD value lower than the OD value of L1; and the thick ink KC is mainly used in case of reproducing the OD value higher than L2. FIG. 12 is a diagram showing a circuit section for the cyan ink in the head selecting control section 75.

In FIG. 12, reference numerals 78 and 79 denote binary counters; 80 indicates an ROM (read only memory) in which a dither pattern has been stored; and 81 is a magnitude comparator.

A clock $C_X$ to be generated when the head is traveled in the main scanning direction is input to the counter 78. A clock $C_Y$ to be generated when the head is moved in the sub-scanning direction is input to the counter 79. A dither pattern of $2 \times 2$ as shown in FIG. 13A has been stored in the ROM 80 and (0,0), (0,1), (1,0), and (1,1) of the coordinates (X,Y) in the dither ROM are selected in accordance with the movement of the head and the threshold value corresponding to the coordinates is input to one input terminal of the comparator 81. The digital value $C_3$ indicative of the reproduction density of cyan is input to the other input terminal. The comparator 81 makes the signal CC at a high level when $C_3 > C_D$ and makes it at a low level when $C_3 \leq C_D$.

For example, when $C_3$ changes as shown in FIG. 13B, the dots are formed as shown in FIG. 13C.

In FIG. 13C ○ denotes a microdot formed by the thin ink, while ⊘ represents a microdot formed by the thick ink. Since the size of a microdot is variably controlled in accordance with the density value $C_3$, as shown in FIG. 13C, sizes of the dots to be formed by the thick and thin inks when $C_3$ is 0.52 are different from the sizes when $C_3$ is 0.56.

Since the region of the thin ink increases more as L2 approaches LA, a rough feeling due to the microdots of the thick ink is eliminated; however, if L2 approaches LA too closely, a quantity of ink will have contrarily increased. Thus, it is preferable to set L2 into a value of the order within a range of an ink absorption quantity of a paper to be used.

The case of cyan has been described above, but it can be also realized similarly with respect to magenta, yellow and black.

In addition, although there has been described the case where the inks in which each color has two kinds of different ink densities are used, the invention can be applied even in the case where the cyan ink having three kinds of different densities, for example, is used.

In this case, since the number of switching points of the thick and thin inks increases, L3 and L4 may be added in addition to the threshold values L1 and L2 as shown in FIG. 14.

Also, the dither matrix is not limited to the case of $2 \times 2$, but $3 \times 3$, $4 \times 4$, etc. may be also used.

Furthermore, it is also possible to change the size of the dither matrix in dependence upon the boundary portion and thereby to use the dither matrix of $3 \times 3$ for a thicker boundary portion and to use $2 \times 2$ for a thinner boundary portion. In addition, the other density modulating method such as a density pattern method or the like may be used without limiting the invention to the dither method.

Figure 15:
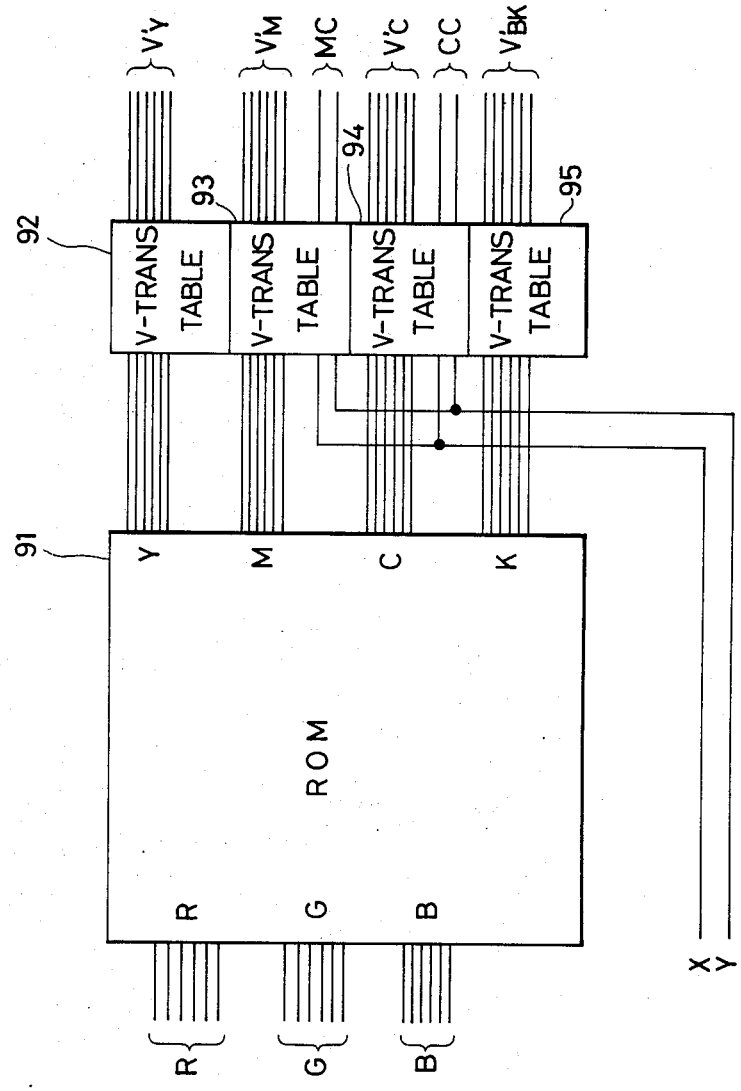
FIG. 15 shows an image processing circuit of another example.

On the other hand, although the invention has been realized by hardware using the dither ROM for the data of $C_3$, $M_3$, $Y_3$, and $BK_3$ in this embodiment, it may be realized by software using a microcomputer. Moreover, as shown in FIG. 15, it is also possible to preliminarily calculate the sections indicated by 71, 72, 73, and 74 in FIG. 9 and to store the results into an ROM 91, thereby enabling $Y_3$, $M_3$, $C_3$, and $BK_3$ to be obtained by referring the table. FIG. 15 shows the case where the cyan ink having three kinds of different densities, the magenta ink having three kinds of densities, the yellow ink having one kind of density, and the black ink having one kind of density are used. The OD values of four colors of Y, M, C, and K are output as 6-bit data from the ROM 91 and are input to voltage transduction tables 92 to 95. The modulation of "2" of each of the main scanning direction address X and sub-scanning direction address Y is added to the respective OD value data to produce a signal of total 8 bits, and this signal is input to the voltage transduction tables 92–95, and the results are output as the voltage values. Since magenta and cyan among them have respectively three kinds of inks having different densities, signals to discriminate them are output as CC and MC. Namely, when CC=0, it represents the thinnest ink; CC=1 indicates the mid-density ink; and CC=2 denotes the thickest ink.

As described above, according to the second embodiment of the present invention, the thick dots and thin dots appear at the rate in response to the reproduction density level in the overlapped region of the thick and thin dots, so that it is possible to prevent the occurrence of a false profile due to the change-over between the thick and thin dots, thereby enabling a color picture image with high gradient and high quality to be reproduced.

In this way, the second embodiment has been described.

In the second embodiment, to further enhance the reproduction range, it is necessary to further increase the kinds of densities of the inks to be used. The number of heads increases with an increase in number of kinds of the ink densities, and causing the apparatus to become complicated and its cost to be raised; therefore, the increase in kinds of inks is undesirable. A third embodiment which will be described below relates to a further improvement of the second embodiment.

Third Embodiment

In the third embodiment, an overall control block diagram, signal processing circuit and head drive circuit are constituted substantially in the similar manner as those in the second embodiment. However, since the operation of the head selecting control circuit 75 is different from that in the second embodiment, this point will be described in detail hereinbelow.

Figure 16A:
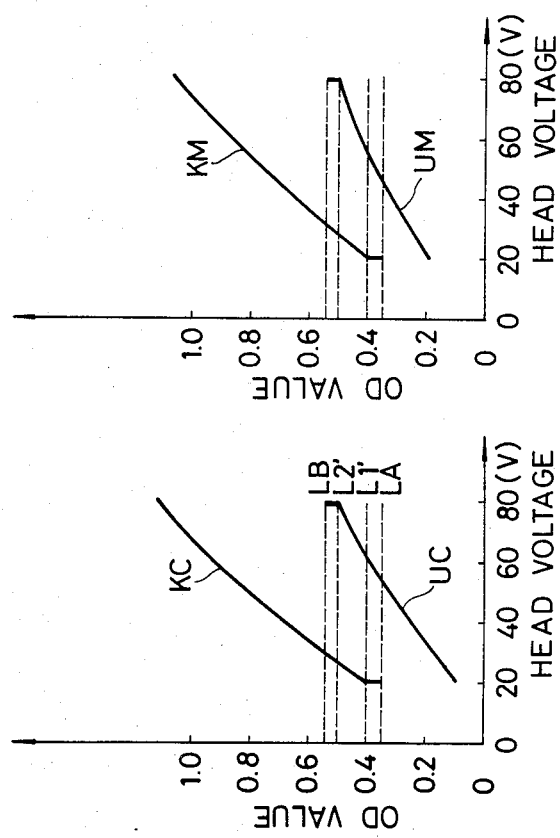
FIGS. 16A, 16B and 16C show head voltage - OD value characteristic diagrams in a third embodiment.
Figure 16B:
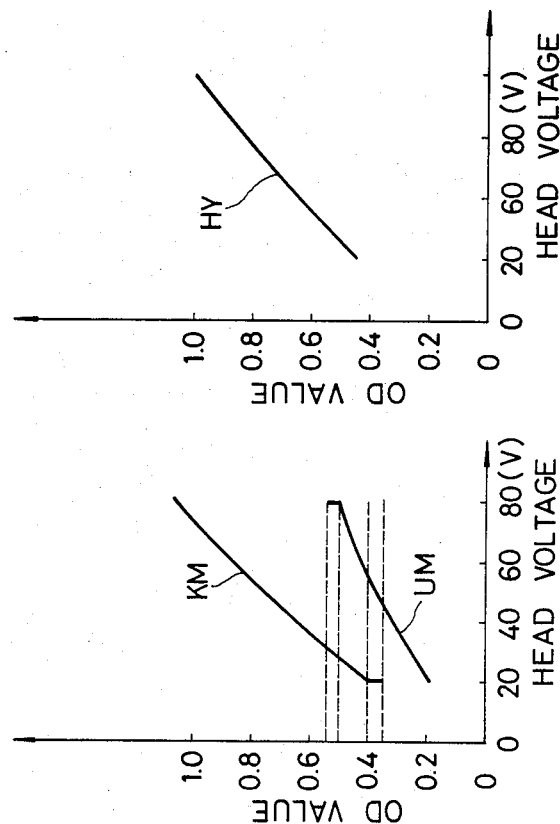
Figure 16C:
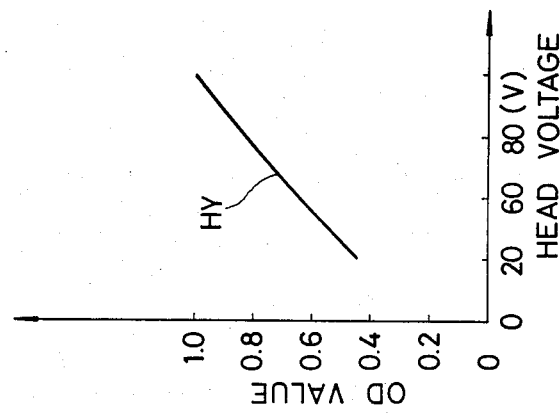

FIGS. 16A, 16B and 16C show the characteristics of the reproduction average reflection optical density (or OD value) for the head applied voltage of each of the cyan, magenta and yellow inks in the third embodiment. KC denotes the thick cyan ink; UC is the thin cyan ink; KM is the thick magenta ink; UM is the thin magenta ink; and HY is the yellow ink. The case of cyan will now be described. As shown in FIG. 16A, the thin cyan ink UC can reproduce the OD values from 0.10 to 0.50, while the thick cyan ink KC can reproduce the OD values from 0.40 to 1.12. A range between the OD values of L1' and L2', i.e., 0.40–0.50 is the overlapped region where it can be expressed by any of the thick and thin inks.

Since a range of this overlapped region is extremely narrow, a false profile will easily occur at the boundary portion of different densities. Therefore, in this embodiment, three regions are set: i.e., a region in a density range of LA (0.35)–L1' (0.40) where it is inherently impossible to reproduce by the thick ink; a region in a density range of L2' (0.50)–LB (0.55) where it is inherently impossible to reproduce by the thin ink; and an enlarged overlapped region consisting of the overlapped region. In this region, the dots of the thick ink and the dots of the thin ink are formed at the rate corresponding to the density. Therefore, only the dots of the thin ink having sizes corresponding to a magnitude of the reproduction OD value are formed in the region below the OD value of LA; only the dots of the thick ink having the sizes according to a magnitude of the reproduction OD value are formed in the region above the OD value of LB; and both of them are formed in the enlarged overlapped region of the OD values of LA–LB. On one hand, although the enlarged overlapped region is extended to both sides of the overlapped region in this embodiment, it may be extended to only one side.

Figure 17:
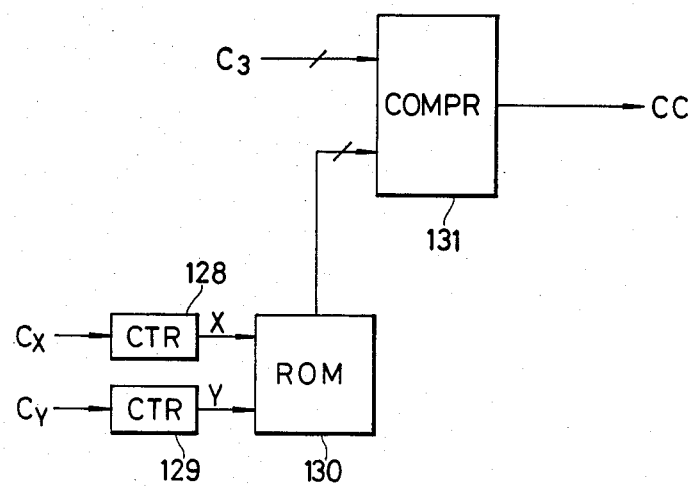
FIG. 17 shows a detailed circuit diagram of the head selecting control section.

FIG. 17 shows a detailed circuit diagram of the head selecting control circuit 75 to realize such a method.

In the diagram, reference numerals 128 and 129 denote binary counters; 130 is an ROM (read only memory) in which a dither pattern has been stored; and 131 is a magnitude comparator.

The clock $C_X$ to be generated when the head is moved in the main scanning direction is input to the counter 128, while the clock $C_Y$ to be generated when the head is moved in the sub-scanning direction is input to the counter 129.

Figures 18A, 18B, 18C:
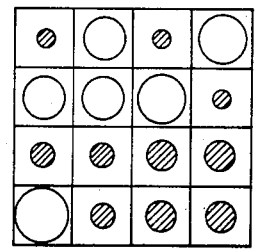
FIGS. 18A, 18B and 18C show diagrams to describe the operation of the head selecting control section in the third embodiment.

The dither pattern of 2×2 as shown in FIG. 18A has been stored in the ROM 130 and (0,0), (0,1), (1,0), and (1,1) of the coordinates (X,Y) in the dither ROM are selected in accordance with the movement of the head. The threshold value corresponding to the coordinates is input to one input terminal of the comparator 131. The digital value $C_3$ indicative of the reproduction density of cyan is input to the other input terminal. The comparator 131 makes the signal CC at a high level when $C_3 > C_D$ and makes it at a low level when $C_3 \leq C_D$.

For instance, when $C_3$ changes as shown in FIG. 18B, the dots as shown in FIG. 18C are formed.

Figure 19:
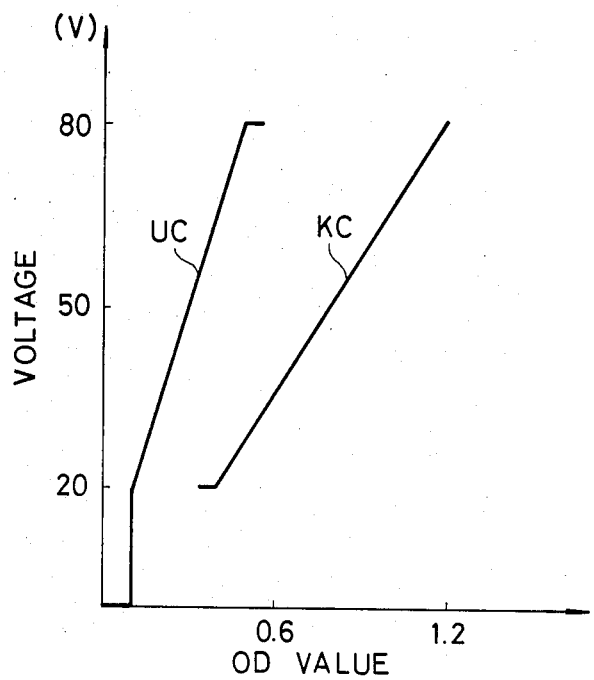
FIG. 19 is a diagram showing the relations between the OD value and the applied voltage.

In FIG. 18C, ○ denotes a microdot formed by the thin ink, while ⊘ represents a microdot formed by the thick ink. Since the size of the microdot is variably controlled in dependence upon the density value of $C_3$, as shown in FIG. 18C, sizes of the dots to be formed by the thick and thin inks when $C_3$ is 0.37 are different from the sizes when $C_3$ is 0.52. However, a size of the dot of the thin ink when $C_3$ is over 0.5 is saturated with its maximum size, and when $C_3$ is below 0.4, a size of the dot of the thick ink is saturated with its minimum size. FIG. 19 shows the relations between the OD value to be reproduced and the voltage to be applied to the head. In any cases, in the enlarged section of the enlarged overlapped region, the applied voltage is set to the maximum voltage at which the maximum dot is formed or into the minimum voltage at which the minimum dot is formed.

In this way, in the enlarged overlapped region, a desired OD value is obtained on an average by individually forming the thick and thin dots, and at the same time it is possible to realize a considerable difference in density between the inks themselves, so that this allows the reproducible range to be enhanced. Moreover, picture quality will be improved since a sense of incompatibility at the boundary portion between the thick and thin dots is eliminated.

Fourth Embodiment

Figure 20:
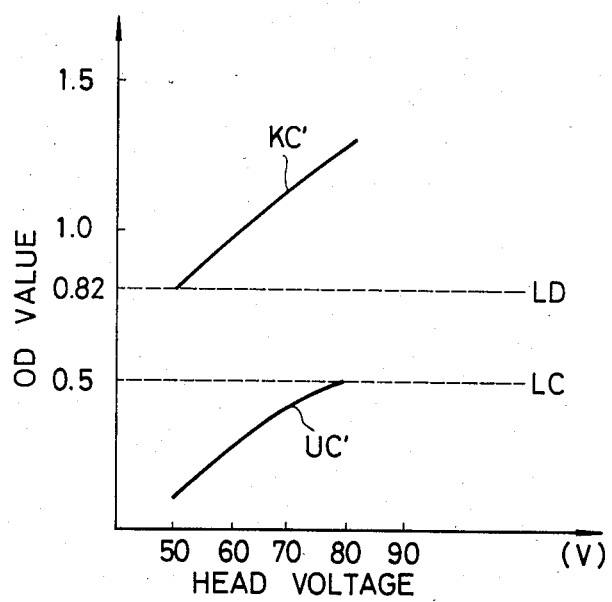
FIG. 20 shows a head voltage - OD value characteristic diagram with respect to a cyan ink in a fourth embodiment.

The fourth embodiment of the present invention will then be described. FIG. 20 shows the characteristics of the reproduction OD values for the head applied voltages of a thick cyan ink KC' and a thin cyan ink UC' which are used in the fourth embodiment. As shown in FIG. 20, the thin ink UC' can reproduce tne OD values from 0.10-0.50, while the thick ink KC' can reproduce the OD values from 0.82-1.30. Therefore, the intermediate region of LC (0.50)-LD (0.82) does not belong to both reproduction ranges cannot be inherently reproduced.

In this embodiment, such an intermediate region is reproduced by allowing the minimum dots of the thick ink and the maximum dots of the thin ink to be formed at the rate corresponding to the density. The head control section 75 to realize such a method can be realized in the similar manner as the constitution shown in FIG. 17 in the third embodiment except that the content of the ROM 130 to generate the dither pattern differs. The content of the ROM 130 in the fourth embodiment is shown in FIG. 21A. Therefore, when the digital value $C_3$ indicative of the reproduction OD value changes, for example, as shown in FIG. 21B, the dots as shown in FIG. 21C are formed.

In FIG. 21C, ○ denotes a microdot formed by the thin ink, and ⊘ represents a microdot formed by the thick ink. Although a size of the microdot varies in the reproducible range of each ink in dependence upon the OD value to be reproduced, it does not vary in the foregoing intermediate region.

FIG. 22 shows the relations between the OD value to be reproduced and the voltage to be applied to the head. As shown in FIG. 22, in the intermediate region, the head applied voltage is set to the maximum voltage at which the minimum dot is formed in case of the thick ink and into the minimum voltage at which the maximum dot is formed in case of the thin ink.

In this way, even in a case where the OD value which cannot be inherently reproduced, a desired OD value is obtained on an average by appropriately independently emitting the thick and thin inks. At the same time, it is also possible to realize a considerable difference in density of the inks themselves, so that this allows the reproducible range to be remarkably enhanced. Moreover, a sense of incompatibility at the boundary portion between the thick and thin dots is eliminated, thereby permitting a picture quality to be improved.

Although the case of cyan has been described in the foregoing third and fourth embodiments, it can be similarly realized even with regard to magenta. In addition, although yellow has one kind of density in the third embodiment, a plurality of kinds of densities are also available. On the other hand, although the case has been described whereby the inks having two kinds of different densities with respect to each color are used, the present invention can be also applied to the case where, for example, the cyan ink having three kinds of different densities is used.

Also, the dither matrix is not limited to $2 \times 2$ but may be set into $3 \times 3$, $4 \times 4$, or $n \times n$; in addition, the dither matrix of $n \times m$ (where, n and m are different integers) or transformed dither patterns may be also available. Furthermore, it is also possible to change a size of the dither matrix depending upon the boundary portion and thereby to use the dither matrix of $3 \times 3$ at a thicker boundary portion and to use $2 \times 2$ at a thinner boundary portion. On the other hand, it is also possible to use a density pattern method for forming a plurality of dots for one pixel of the input and the like without limiting to the dither method.

In addition, although the invention has been realized by a hardware using the dither ROM for the data of $C_3$, $M_3$, $Y_3$, and $BK_3$ in the third and fourth embodiments, it may be realized by a software using a microcomputer. Furthermore, as shown in FIG. 15, it is also possible to store the arithmetic results into the ROM 91 and thereby to obtain $Y_3$, $M_3$, $C_3$, and $BK_3$ by referring the table.

According to the third and fourth embodiments of the present invention as described above, in the case where there is not the overlapped region in the density reproduction range of the colorants having different densities or even when it exists, even if its range is narrow, the occurrence of a false profile can be prevented and the density reproduction range can be also remarkably extended without increasing the number of colorants having different densities. Therefore, a picture image with high gradient and high quality can be extremely simply realized, and the invention is also advantageous for the industrial use.

As described above in detail, according to the first to fourth embodiments of the present invention, it is possible to prevent the occurrence of a false profile to be produced in case of using the high density dots and low density dots, so that a picture image with high gradient and high quality can be formed.

In addition, the present invention is not limited to the above-described embodiments, but various changes and modifications are possible within the spirit and scope of the appended claims.

What is claimed is:

1. An image producing method comprising the steps of:

forming microdots using plural colorants having different concentrations;

variably controlling the size of said dots;

establishing a plurality of optical density regions, including an overlapped region which may be produced by applying either of said plural colorants, a lower optical density region which may be produced by the lower concentration colorants among said plural colorants and which has an optical density lower than that of said overlapped region, and a higher optical density region which is produced by the higher concentration colorants among said plural colorants and which has an optical density higher than that of said overlapped region;

expressing said lower optical density region by using only said lower concentration colorants, said higher optical density region by using only said higher concentration colorants, and said overlapped region by using both of said colorants; and controlling the relative amounts of said colorants used to form the microdots in accordance with a desired reproduction optical density.

2. An image producing method according to claim 1, further comprising the step of providing pixels consisting of a plurality of cells of dots, wherein in said expressing step, the frequency of occurrence of the dots of colorants with higher and lower concentrations in one pixel is gradually varied.

3. An image producing method according to claim 1, wherein in said forming step, the microdots are formed by droplets to be emitted from an ink-jet head.

4. A color image reproducing method comprising the steps of:

provteding a plurality of colorants in which at least one color among a plurality of colors to be used to reproduce a color image has plural colorants provided in different concentrations;

forming microdots using said plural colorants;

establishing a plurality of optical density regions, including an overlapped region which may be produced by applying a ratio of said plural colorants, a lower optical density region which may be produced by the lower concentration colorants among said plural colorants and which has an optical density lower than that of said overlapped region, and a higher optical density concentration region which may be produced by the higher concentration colorants among said plural colorants and which has an optical density higher than that of said overlapped region;

expressing said lower optical density concentration region by using only said lower concentration colorants, said higher optical density concentration region by using only said higher concentration colorants and said overlapped region by using a ratio of both of said colorants; and controlling the relative amounts of said colorants used to form the microdots in accordance with a desired reproduction optical density.

5. A color image reproducing method according to claim 1, further comprising the step of providing pixels consisting of a plurality of cells of dots, wherein in said expressing step, the frequency of occurrence in one pixel fo microdots of the higher concentration colorant and of microdots of the lower concentration colorant is varied in accordance with the optical density.

6. A color image reproducing method according to claim 5, wherein in said expressing step, said frequency of occurrence is variably controlled in accordance with the optical density using a dither method.

7. A color image reproducing method according to claim 1, wherein at least cyan, magenta and yellow colorants are used.

8. A color image reproducing method according to claim 7, wherein the microdots are formed using plural colorants having different concentrations with respect to cyan and magenta.

9. A color image reproducing method according to claim 8, wherein the microdots are formed by droplets to be emitted by an ink-jet head.

10. A color image reproducing method comprising the steps of:

providing a plurality of colorants in which at least one color among a plurality of colors to be used to reproduce a color image has plural colorants provided in different concentrations;

forming microdots using said plural colorants;

variably controlling the size of the microdots of said plural colorants;

establishing an intermediate region which lies between the optical density ranges capable of being reproduced by any one of said plural colorants; and expressing the optical density in said intermediate region using both microdots of a mimimum size and a higher concentration colorant and microdots of a maximum size and a lower concentration colorant.

11. A color image reproducing method according to claim 10, wherein in said expressing step, microdots of the higher concentration colorant and microdots of the lower concentration colorant are formed at rates depending upon the optical density.

12. A color image reproducing method according to claim 11, further comprising the step of providing pixels consisting of a plurality of cells of dots, wherein in said expressing step, the frequency of occurrence in one pixel of microdots of the higher concentration colorant and of microdots of the lower concentration colorant is varied in accordance with the optical density.

13. A color image reproducing method according to claim 12, wherein in said expressing step, said frequency of occurrence is variably controlled in accordance with the optical density using a dither method.

14. A color image reproducing method according to claim 10, wherein at least cyan, magenta and yellow colorants are used.

15. A color image reproducing method according to claim 14, wherein the microdots are formed using plural colorants having different concentrations with respect to cyan and magenta.

16. A color image reproducing method according to claim 15, wherein the microdots are formed by droplets to be emitted by an ink-jet head.

* * * * *

UNITED STATES PATENT AND TRADEMARK OFFICE
CERTIFICATE OF CORRECTION

PATENT NO. : 4,635,078                  Page 1 of 3
DATED : January 6, 1987
INVENTOR(S) : NOBUAKI SAKURADA, ET AL.

It is certified that error appears in the above-identified patent and that said Letters Patent is hereby corrected as shown below:

COLUMN 1

Line 41, "quality deteriorate." should read --quality to deteriorate.--.

COLUMN 2

Line 22, "with accompanying" should read --with the accompanying--.
Line 27, "average, reflection" should read --average reflection--.
Line 49, "abd" should read --and--.

COLUMN 3

Line 13, " an the" should read --an--.

COLUMN 4

Line 11, "ofemission" should read --of emission--.
Line 17, "the" should be deleted.

COLUMN 5

Line 61, "but is" should read --but it is--.

COLUMN 9

Line 38, "causing" should read --causes--.

COLUMN 10

Line 58, "into" should read --to--.

UNITED STATES PATENT AND TRADEMARK OFFICE
CERTIFICATE OF CORRECTION

PATENT NO. : 4,635,078

DATED : January 6, 1987

INVENTOR(S) : NOBUAKI SAKURADA, ET AL.

It is certified that error appears in the above-identified patent and that said Letters Patent is hereby corrected as shown below:

COLUMN 11

Line 8,    "tne" should read --the--.
    Line 12,   "ranges cannot" should read --ranges and cannot--.
    Line 38,   "into" should read --to--.
    Line 40,   "which" should be deleted.

COLUMN 12

Line 6,    "a" should be deleted.
    Line 8,    "a" should be deleted.
    Line 11,   "referring the" should read --referring to the--.
    Line 22,   "ex-" should be deleted.
    Line 23,   "tremely" should read --very--.

COLUMN 13

Line 15,   "concentration" should be deleted.
    Line 20,   "concentration" should be deleted.
    Line 22,   "concentration" should be deleted.

UNITED STATES PATENT AND TRADEMARK OFFICE
CERTIFICATE OF CORRECTION

PATENT NO. : 4,635,078
DATED : January 6, 1987
INVENTOR(S) : NOBUAKI SAKURADA, ET AL.

It is certified that error appears in the above-identified patent and that said Letters Patent is hereby corrected as shown below:

<u>COLUMN 13</u>

Line 30, "claim 1," should read --claim 4,--.
    Line 33, "fo" should read --of--.
    Line 42, "claim 1," should read --claim 4,--.

Signed and Sealed this

Eighth Day of September, 1987

Attest:

DONALD J. QUIGG

*Attesting Officer*      *Commissioner of Patents and Trademarks*